3,168,567
HINDERED ALKYL AND ALKYLENE
SECONDARY AMINES
Nelson R. Easton, Indianapolis, and George F. Hennion, South Bend, Ind., assignors to Eli Lilly and Company, Indianapolis, Ind., a corporation of Indiana
No Drawing. Filed Feb. 29, 1960, Ser. No. 11,438
6 Claims. (Cl. 260—583)

This invention relates to certain novel hindered alkyl and alkylene amines and to their acid addition salts.

The hindered amines provided by this invention can be represented by the following formula:

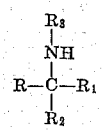

wherein R is methyl or ethyl, $R_1$ is ethyl or vinyl, $R_2$ is methyl, ethyl or isopropyl, and $R_3$ is ethyl, isopropyl, t-butyl or t-amyl, the sum of the carbon atoms in R, $R_1$, $R_2$ and $R_3$ being greater than 6. Also included within the scope of this invention are the nontoxic pharmaceutically-acceptable acid addition salts of amines represented by the above formula.

The free bases provided by this invention are volatile oils having a typical amine odor. The nontoxic pharmaceutically-acceptable acid addition salts of these amines are white crystalline solids soluble in most polar solvents including water. Among the acids which are useful for forming the pharmaceutically-acceptable acid addition salts of this invention are both inorganic and organic acids; for example, hydrochloric acid, sulfuric acid, phosphoric acid, hydrobromic acid, maleic acid, succinic acid, cinnamic acid, tartaric acid and the like.

Illustrative compounds provided by this invention include:

3-t-butylamino-3-methylbutane hydrochloride
3-t-amylamino-3-methylpentane sulfate
3-isopropylamino-3-ethylpentane phosphate
3-ethylamino-3,4-dimethylpentane hydrochloride
3-isopropylamino-3-methyl-1-pentene hydrobromide
3-t-butylamino-3-methyl-1-butane hydrochloride
3-t-butylamino-3-methyl-1-pentene maleate
3-ethylamino-3-ethyl-1-pentene tartrate, and
3-t-butylamino-3-ethyl-1-pentene citrate The free bases of this invention are prepared by either hydrogenation or semihydrogenation of an α-aminoacetylene represented by the following formula:

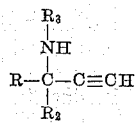

wherein R, $R_2$ and $R_3$ have the same meaning as hereinabove.

The compounds containing an ethylenic linkage are prepared by catalytic semihydrogenation of an α-aminoacetylene of the above formula. The semihydrogenation is carried out at low temperature and pressure, temperatures below 40° C. and pressures of 75 p.s.i. or less being entirely satisfactory. In carrying out the reaction, the amine is customarily dissolved in a nonpolar solvent such as methylcyclohexane, ether, benzene, pentane, hexane and the like. The preferred catalyst for the semihydrogenation reaction is a noble metal catalyst such as palladium-on-activated charcoal, palladium-on-barium carbonate and the like. Raney nickel can also be used. In carrying out the semihydrogenation, the reaction is interrupted after the theoretical quantity of hydrogen has been absorbed so as to minimize the production of the corresponding fully hydrogenated derivative, and to maximize production of the semihydrogenated ethylene which can then be isolated by methods well known to the art.

The fully saturated compounds of this invention are prepared by completely hydrogenating either an α-aminoacetylene as represented by the above formula or by hydrogenating the corresponding compound containing an ethylenic linkage. These hydrogenations are carried out at low pressure and at ambient room temperature, under conditions similar to those previously outlined for the hydrogenation of α-aminoacetylenes to yield ethylenic amines. The catalyst employed is either a Raney nickel catalyst or a noble metal catalyst, the latter being used in acidic media. When a noble metal catalyst is to be employed, an acid addition salt of an α-aminoacetylene or of an α-aminoethylene is prepared and is dissolved in an inert polar solvent such as ethanol. The solvent usually contains excess acid. It is however often convenient to prepare the acid addition salt in situ by adding an acid to an ethanolic solution of the acetylenic amine free base. When Raney nickel is used as a catalyst the amine itself can be hydrogenated in a polar solvent.

The compounds of this invention, either in the form of their free bases or as nontoxic pharmaceutically-acceptable acid addition salts thereof, have pronounced activity as ganglionic blocking agents, and demonstrate their activity when administered by the oral route.

This invention is more fully illustrated by the following specific examples:

EXAMPLE 1

Preparation of 3-isopropylamino-3-methyl-1-butene 12.8 g. of 3-isopropylamino-3-methyl-1-butyne were dissolved in about 50 ml. of hexane and about 0.01 g. of a 10 percent palladium-on-activated charcoal catalyst were added to the solution. The mixture was hydrogenated in a low pressure hydrogenation apparatus at an initial pressure of 41 p.s.i. After 7 hours, the hydrogen pressure had dropped by about 8.8 p.s.i. After the pressure had remained stationary for 30 minutes, the hydrogenation mixture was removed from the hydrogenation apparatus, the catalyst was separated by filtration and the solevnt was removed by distillation through a 30 cm. glass helix-packed column. The distillation residue comprising 3-isopropylamino-3-methyl-1-butene formed in the above reaction was distilled through the same column. Fractions boiling in the range 100–122° C. at atmospheric pressure were collected, were dried and were redistilled. Purified 3-isopropylamino-3-methyl-1-butene boiled at about 121–122° C.; $n_D^{25} = 1.417$.

Analysis.—Calc.: N, 11.01. Found: N, 10.87.

3-isopropylamino-3-methyl-1-butene hydrochloride was prepared from the free base by dissolving 1 g. of the free base in ether and adding to the solution an excess of a saturated ethereal hydrogen chloride solution. The salt, being insoluble in ether, precipitated and was isolated by filtration. 3-isopropylamino-3-methyl-1-butene hydrochloride thus prepared was recrystallized from an ethanol-ethyl acetate solvent mixture. It melted at about 115–116° C.

Analysis.—Calc.: C, 58.70; H, 11.08; N, 8.56. Found: C, 58.89; H, 11.13; N, 8.48.

3-isopropylamino-3-methyl-1-butene succinate can be prepared according to the above procedure by using succinic acid in ethereal solution in place of the saturated ethereal hydrogen chloride solution.

EXAMPLE 2

*Preparation of 3-t-butylamino-3-ethyl-1-pentene*

8.35 g. of 3-t-butylamino-3-ethyl-1-pentyne were dissolved in 50 ml. of ethanol and were hydrogenated at low pressure using 2 g. of a heavy suspension of Raney nickel in ethanol as a catalyst. After the uptake of hydrogen had ceased, the hydrogenation mixture was removed from the apparatus and was filtered to remove the catalyst. 3-t-butylamino-3-ethyl-1-pentene formed in the above reaction was isolated as the hydrochloride salt by adding cold 12 N hydrochloric acid dropwise to the filtrate until the filtrate became acid. Evaporation of the ethanol left the hydrochloride salt as a crystalline residue. Recrystallization of the residue from a mixture of ethyl acetate and isopropanol yielded 3-t-butylamino-3-ethyl-1-pentene hydrochloride melting at about 183–184° C.

*Analysis.*—Calc.: C, 64.20; H, 11.76; N, 6.81. Found: C, 64.32; H, 11.50; N, 6.87.

The phosphate salt of 3-t-butylamino-3-ethyl-1-pentene can be prepared by following the above procedure but substituting syrupy phosphoric acid for 12 N hydrochloric acid.

3-t-butylamino-3-ethyl-1-pentene hydrochloride was dissolved in water and the aqueous solution was made alkaline to litmus by the addition of cold 50 percent sodium hydroxide, thus forming 3-t-butylamino-3-ethyl-1-pentene free base. The free base was insoluble in the alkaline layer, and was extracted into ether. The ether extract was separated and was dried. The ether was removed by distillation at atmospheric pressure, leaving a residue comprising 3-t-butylamino-3-ethyl-1-pentene. The residue was distilled, and 3-t-butylamino-3-ethyl-1-pentene boiled at about 78° C. at a pressure of 18 mm. of mercury; $n_D^{25}=1.443$.

*Analysis.*—Calc.: N, 8.27. Found: N, 8.11.

EXAMPLE 3

*Preparation of 3-t-butylamino-3-methyl-1-butene*

7 g. of 3-t-butylamino-3-methyl-1-butyne were dissolved in 200 ml. of methyl cyclohexane. 30 mg. of 5 percent palladium-on-carbon were added as a hydrogenation catalyst. The mixture was placed in a low pressure hydrogenation apparatus and was semihydroegnated. After the theoretical quantity of hydrogen had been absorbed, the mixture was removed from the apparatus, was filtered to remove the catalyst and anhydrous hydrogen chloride gas was bubbled into the filtrate. 3-t-butylamino-3-methyl-1-butene hydrochloride thus formed precipitated and was isolated by filtration. The precipitate which was recrystallized from a mixture of ethyl acetate and isopropanol, melted at abut 202–204° C.

*Analysis.*—Calc.: N, 7.88. Found: N, 7.73.

3-t-butylamino-3-methyl-1-butene free base can be isolated from the hydrochloride salt by the procedure of Example 2.

EXAMPLE 4

*Preparation of 3-ethylamino-3-methyl-1-pentene*

Following the procedure of Example 1, 3-ethylamino-3-methyl-1-pentyne were semihydrogenated using 5 percent palladium-on-activated charcoal as a catalyst. After the absorption of hydrogen had ceased, the catalyst was separated by filtration. 3-ethylamino-3-methyl-1-pentene formed in the above reaction was isolated and purified by the method of Example 1. 3-ethylamino-3-methyl-1-pentene boiled at about 77° C. at a pressure of 110 mm. of mercury; $n_D^{25}=1.427$.

*Analysis.*—Calc.: N, 11.01. Found: N, 11.27.

Following the procedure of Example 1, 3-ethylamino-3-methyl-1-pentene hydrochloride was prepared from the free base and melted at about 114–117° C.

*Analysis.*—Calc.: C, 58.70; H, 11.08; N, 8.56. Found: C, 58.54; H, 11.14; N, 8.37.

EXAMPLE 5

*Prepapartion of 3-isopropylamino-3-ethyl-1-pentene*

Following the procedure of Example 1, 3-isopropylamino-3-ethyl-1-pentyne were semihydrogenated over a 5 percent palladium-on-carbon catalyst. After the absorption of hydrogen had ceased, the catalyst was separated by filtration and 3 - isopropylamino - 3 - ethyl-1-pentene formed in the above reaction was isolated and purified by the procedure of Example 1. 3-isopropylamino-3-ethyl-1-pentene boiled at about 89° C. at a pressure of 50 mm. of mercury; $n_D^{25}=1.436$.

*Analysis.*—Calc.: N, 902. Found: N, 9.29.

Following the procedure of Example 1, 3-isopropylamino 3-ethyl-1-pentene hydrochloride was prepared from the free base. It melted at about 196–198° C.

*Analysis.*—Calc.: C, 62.64; H, 11.57; N, 7.30. Found: C, 62.84; H, 11.79; N, 7.41.

EXAMPLE 6

*Preparation of 3-ethylamino-3-ethyl-1-pentene*

The procedure of Example 1 was followed except that a 5 percent palladium-on-barium carbonate catalyst was substituted for the palladium-on-activated charcoal catalyst of that example. After the absorption of hydrogen had ceased, the catalyst was separated by filtration. 3-ethylamino-3-ethyl-1-pentene formed in the above reaction was isolated and purified by the procedure of Example 1. 3-ethylamino-3-ethyl-1-pentene thus prepared boiled at about 84° C. at a pressure of 70 mm. of mercury; $n_D^{25}=1.436$.

*Analysis.*—Calc.: N, 9.92. Found: N, 10.34.

EXAMPLE 7

*Preparation of 3-t-butylamino-3-ethylpentane*

7.5 g. of 3-t-butylamino-3-ethyl-1-pentene were dissolved in about 200 ml. of ethanol containing 10 ml. of ethanol saturated with hydrogen chloride, thus forming the hydrochloride salt of 3-t-butylamino-3-ethyl-1-pentene. About 30 mg. of platinum oxide catalyst were added and the mixture was hydrogenated in a low pressure hydrogenation apparatus. After the hydrogenation had proceeded for about 2 hours, an additional 30 mg. of platinum oxide were added. After about 4 hours, the catalyst was removed by filtration, 60 mg. of fresh platinum oxide catalyst were added and the mixture was hydrogenated for an additional 14 hours. The hydrogenation mixture was removed from the apparatus and the catalyst was separated by filtration. The filtrate containing 3-t-butylamino-3-ethylpentane hydrochloride formed in the above reaction was concentrated to a residue and the residue was recrystallized from ethyl acetate. 3-t-butylamino-3-ethylpentane hydrochloride thus purified melted with decomposition at about 172–173° C.

*Analysis.*—Calc.: C, 63.58; H, 12.61. Found: C, 63.24; H, 12.48.

3-t-butylamino-3-ethylpentane free base can be prepared by neutralizing an aqueous solution of the hydrochloride salt, extracting the liberated free base with ether and removing the ether by distillation, leaving the free base as a residue.

EXAMPLE 8

*Preparation of 3-t-butylamino-3-methylbutane*

28 g. of 3-t-butylamino-3-methyl-1-butyne were dissolved in ethanolic hydrochloric acid, thus forming the hydrochloride salt of the amine. 50 mg. of platinum oxide were added to the solution and the mixture was hydrogenated at low pressure as set forth in Example 7, yielding as a product 3-t-butylamino-3-methylbutane hydrochloride. After the uptake of hydrogen had ceased, the catalyst was removed by filtration and the hydrochloride salt was isolated as a residue by evaporation of the ethanol solvent. Recrystallization of the residue from a mixture of ethyl acetate and anhydrous ethanol yielded purified 3-t-butylamino-3-methylbutane hydrochloride, melting at about 218–219°.

*Analysis.*—Calc.: C, 60.14; H, 12.34; N, 7.79. Found: C, 60.24; H, 12.26; N, 7.82.

3-t-butylamino-3-methylbutane free base was prepared by neutralizing an aqueous solution of the hydrochloride salt, extracting the liberated free base with ether, separating the ether extract and removing the ether by evaporation. The resulting residue comprising 3-t-butylamino-3-methylbutane was purified by distillation in vacuo. 3-t-butylamino-3-methylbutane boiled at 74° C. at 61 mm. of mercury; $n_D^{25}=1.418$.

3-t-butylamino-3-methylbutane was also prepared by hydrogenating 3-t-butylamino-3-methyl-1-butyne at low pressure using Raney nickel as a catalyst, and also by hydrogenating the hydrochloride salt with 5 percent palladium-on-carbon as a catalyst.

EXAMPLE 9

*Preparation of 3-isopropylamino-3-ethylpentane*

Following the procedure of Example 7, 7.7 g. of 3-isopropylamino-3-ethyl-1-pentyne were dissolved in a mixture of 190 ml. of ethanol and 10 ml. of ethanol saturated with hydrogen chloride. The solution was hydrogenated in the presence of 40 mg. of platinum oxide catalyst. 3-isopropylamino-3-ethyl-pentane hydrochloride thus formed was isolated by the procedure of Example 7. It melted at about 217–218° C. after recrystallization from ethyl acetate.

*Analysis.*—Calc.: N, 7.27. Found N, 7.14.

3-isopropyamino-3-ethyl-1-pentene was also hydrogenated as the hydrochloride salt in ethanol solution by the above procedure to yield 3-isopropylamino-3-ethylpentane hydrochloride.

3-isopropylamino-3-ethylpentane free base, as in Example 8, can be prepared by neutralizing an aqueous solution of the hydrochloride salt, extracting the liberated free base with ether and removing the ether by distillation, leaving 3-isopropylamino-3-ethylpentane as a residue.

EXAMPLE 10

*Preparation of 3-isopropylamino-3,4-dimethylpentane*

7.6 g. of 3-isopropylamino-3,4-dimethyl-1-pentyne hydrochloride were dissolved in a mixture of 195 ml. of ethanol and 5 ml. of ethanol saturated with hydrogen chloride. 40 mg. of platinum oxide were added and the mixture was hydrogenated at about 50 lb. hydrogen pressure in a low pressure hydrogenation apparatus. After the theoretical quantity of hydrogen had been absorbed, the mixture was removed from the hydrogenation apparatus and the catalyst was separated by filtration. The filtrate was evaporated to dryness leaving as a residue 3-isopropylamino-3,4-dimethylpentane hydrochloride. Recrystallization of the residue from a mixture of ethyl acetate and methyl cyclohexane yielded 3-isopropylamino-3,4-dimethylpentane hydrochloride, melting at about 183–184° C.

*Analysis.*—Calc.: N, 7.23. Found: N, 7.53.

3-isopropylamino-3,4-dimethylpentane free base can be prepared as in Example 8 by neutralizing an aqueous solution of the hydrochloride salt, extracting the liberated free base into ether and removing the ether by distillation, leaving 3-isopropylamino-3,4-dimethylpentane as a residue.

EXAMPLE 11

*Preparation of 3-t-amylamino-3-methylbutane*

7.7 g. of 3-t-amylamino-3-methyl-1-butyne were dissolved in 200 ml. of ether and 0.5 g. of Raney nickel were added. The mixture was hydrogenated at low pressure. After about 70 percent of the theoretical quantity of hydrogen had been taken up, 40 mg. of platinum oxide were added and the mixture was again hydrogenated at low pressure until the theoretical quantity of hydrogen had been absorbed. The hydrogenation mixture was filtered to remove the catalyst and about 25 ml. of 12 N hydrochloric acid were added to the filtrate, thus forming the hydrochloride salt of 3-t-amylamino-3-methylbutane synthesized during the above hydrogenation. The filtrate was concentrated and was cooled. 3-t-amylamino-3-methylbutane hydrochloride precipitated as a crystalline mass which was separated by filtration. Recrystallization of the precipitate from a benzene-ether solvent mixture yielded 3-t-amylamino-3-methylbutane hydrochloride melting at about 183–185° C.

*Analysis.*—Calc.: N, 7.23. Found: N, 7.45.

3-t-amylamino-3-methylbutane free base can be prepared as in Example 8 by neutralizing an aqueous solution of the hydrochloride salt, extracting the liberated free base into ether and removing the ether by distillation, leaving 3-t-amylamino-3-methylbutane as a residue.

EXAMPLE 12

*Preparation of 3-isopropylamino-3-methylbutane*

Following the procedure of Example 11, 25 g. of 3-isopropylamino-3-methyl-1-butyne were hydrogenated at low pressure in ethanolic solution using Raney nickel as a catalyst. The catalyst was separated by filtration and 100 ml. of ethanol saturated with hydrogen chloride were added to the filtrate, thus forming the hydrochloride salt of the amine. The filtrate was evaporated in vacuo leaving an oily residue comprising 3-isopropylamino-3-methylbutane hydrochloride. The residue was dissolved in water. The acidic aqueous solution was made alkaline to litmus by the addition of 50 percent sodium hydroxide. 3-isopropylamino-3-methylbutane free base, being insoluble in the aqueous layer, separated and was extracted with chloroform. The chloroform extract was separated, was dried and the chloroform was removed by distillation. 3-isopropylamino-3-methylbutane was purified by distillation in vacuo. The compound boiled at about 78–80° C. at a pressure of about 130 mm. of mercury; $n_D^{25}=1.408$.

*Analysis.*—Calc.: N, 10.84. Found: N, 10.72.

The hydrochloride salt of 3-isopropylamino-3-methylbutane was prepared as in Example 11 by adding ethanolic hydrogen chloride to an ethanol solution of the free base, and then evaporating the ethanol, leaving the hydrochloride salt as a residue. The residue was recrystallized yielding 3-isopropylamino-3-methylbutane hydrochloride melting at about 131–132° C.

*Analysis.*—Calc.: C, 57.98; H, 12.17; N, 8.45. Found: C, 57.93; H, 11.85; N, 8.21.

EXAMPLE 13

*Preparation of 3-ethylamino-3-methylpentane*

Following the procedure of Example 7, 3-ethylamino 3-methyl-1-pentyne was hydrogenated in ethanol solution to give 3-ethylamino-3-methylpentane, using Raney nickel as a catalyst. The compound was isolated by the procedure of Example 12 and was purified by distillation. 3-ethylamino-3-methylpentane boiled at about 81° C. at a pressure of 110 mm. of mercury; $n_D^{25}=1.419$.

*Analysis.*—Calc.: N, 10.84. Found: N, 11.12.

3-ethylamino-3-methylpentane hydrochloride was prepared by dissolving the free base in ether and adding thereto an excess of a saturated ethereal hydrogen chloride solution. 3-ethylamino-3-methylpentane hydrochloride melted at about 164–166° C.

*Analysis.*—Calc.: C, 57.98; H, 12.17; N, 8.45. Found: C, 57.61; H, 11.90; N, 8.44.

EXAMPLE 14

*Preparation of 3-isopropylamino-3-methylpentane*

Following the procedure of Example 7, 3-isopropylamino-3-methyl-1-pentyne was hydrogenated in ethanol solution to yield 3-isopropylamino-3-methylpentane, using Raney nickel as a catalyst. The compound was isolated by the procedure of Example 12 and was purified by distillation. 3-isopropylamino-3-methylpentane boiled at about 87° C. at a pressure of 90 mm. of mercury; $n_D^{25}=1.421$.

*Analysis.*—Calc.: N, 9.78. Found: N, 9.99.

3-isopropylamino-3-methylpentane hydrochloride was prepared by dissolving the free base in ether and adding thereto an excess of a saturated ethereal hydrogen chloride solution. 3-isopropylamino-3-methylpentane hydrochloride melted at about 194–196° C.

*Analysis.*—Calc.: C, 60.14; H, 12.34; N, 7.79. Found: C, 60.36; H, 12.18; N, 7.84.

EXAMPLE 15

Preparation of 3-t-butylamino-3-methylpentane

Following the procedure of Example 7, 3-t-butylamino-3-methyl-1-pentyne was hydrogenated in ethanol solution to yield 3-t-butylamino-3-methylpentane, using Raney nickel as a catalyst. The compound was isolated by the procedure of Example 12 and was purified by distillation. 3-t-butylamino-3-methylpentane boiled at about 70° C. at a pressure of 25 mm. of mercury; $n_D^{25}=1.429$.

*Analysis.*—Calc.: N, 8.91. Found: N, 9.33.

3-t-butylamino-3-methylpentane hydrochloride was prepared by dissolving the free base in ether and adding thereto an excess of a saturated ethereal hydrogen chloride solution. 3-t-butylamino-3-methylpentane hydrochloride melted at about 195–196° C.

*Analysis.*—Calc.: C, 61.99; H, 12.48; N, 7.23. Found: C, 62.06; H, 12.25; N, 7.43.

EXAMPLE 16

Preparation of 3-ethylamino-3-ethylpentane

Following the procedure of Example 7, 3-ethylamino-3-ethyl-1-pentyne was hydrogenated in ethanol solution to yield 3-ethylamino-3-ethylpentane, using Raney nickel as a catalyst. The compound was isolated by the procedure of Example 12 and was purified by distillation. 3-ethylamino-3-ethylpentane boiled at about 88° C. at a pressure of 70 mm. of mercury; $n_D^{25}=1.427$.

3-ethylamino-3-ethylpentane hydrochloride was prepared by dissolving the free base in either and adding an excess of an ethereal solution saturated with hydrogen chloride. 3-ethylamino-3-ethylpentane hydrochloride melted at about 189–191° C.

*Analysis.*—Calc.: C, 60.14; H, 12.34; N, 7.79. Found: C, 60.36; H, 12.44; N, 7.80.

EXAMPLE 17

Preparation of salts

Nontoxic pharmaceutically-acceptable salts of hindered alkyl and alkylene amines can be prepared by dissolving the free base in a solvent and adding thereto a solution containing an equivalent amount of a nontoxic acid. If ether is used as a solvent, the acid salt of the amine is usually insoluble therein and can be isolated by filtration. If, on the other hand, a solvent such as ethanol is used in which the amine salt is soluble, the salt is isolated by evaporation of the solvent. As is well known in the art, salts of acids which can be obtained in gaseous form, such as hydrogen chloride, can also be prepared by bubbling the gaseous acid into a solution of the amine. The resulting salt is, as before, isolated according to whether it is soluble or insoluble in the solvent employed.

The α-aminoacetylenes which are used as starting materials for the preparation of the hindered alkyl and alkylene amines of this invention are themselves prepared by reacting the corresponding α-chloroacetylene with a primary amine. The α-chloroacetylenes in turn are conveniently prepared from the corresponding α-hydroxyacetylenes by a procedure based upon that of Hennion and Maloney, J. Am. Chem. Soc. 73, 4735 (1951), with minor modifications.

The following preparation of 3-chloro-3-methyl-1-butyne illustrates the modified procedure used to prepare the α-chloroacetylene starting materials useful for preparing α-aminoacetylene intermediates which are in turn hydrogenated to produce the compounds of this invention.

EXAMPLE 18

Preparation of 3-chloro-3-methyl-1-butyne 167 g. of calcium chloride and 2 g. of copper-bronze powder were mixed in a one-liter round-bottomed flask. 168 g. of 3-methyl-1-butyne-3-ol were added and the resulting mixture was cooled to about 10° C. About 600 ml. of 12 N hydrochloric acid cooled to 0° C., were added in three 200-ml. portions with slight shaking. The reaction mixture was maintained at about 10–15° C. for about 15 minutes and was then allowed to warm up slowly to ambient room temperature. After a total reaction time of about one hour, the lower acidic aqueous layer was separated and was discarded. The organic layer was washed twice with 200-ml. portions of distilled water followed by a 100-ml. portion of a 10 percent sodium bicarbonate solution. The washes were all discarded. The organic layer was then steam distilled until about 90 percent of the organic layer had distilled. The aqueous portion of the distillate was separated and discarded. The organic layer containing 3-chloro-3-methyl-1-butyne formed in the above reaction was dried over solid anhydrous potassium carbonate and was then distilled through an electrically heated 60 cm. fractionating column. The fraction distilling in the range 72–77° C. at atmospheric pressure was collected. Redistillation of this fraction through the same column gave 105 g. of purified 3-chloro-3-methyl-1-butyne boiling in the range 74–76° C. at atmospheric pressure; $n_D^{25}=1.416$.

3-chloro-3,4-dimethyl-1-pentyne was prepared by the above procedure from 3,4-dimethyl-1-pentyne-3-ol. 3-chloro-3,4-dimethyl-1-pentyne boils at about 64–65° C. at a pressure of 52 mm. of Hg; $n_D^{25}=1.448$.

The preparation of the α-aminoacetylene intermediates, useful for preparing the alkyl and alkylene amines of this invention, is patterned after the procedure of Hennion and Nelson, J. Am. Chem. Soc. 79, 2142 (1957). According to this procedure, an α-chloroacetylene prepared by the method set forth in Example 18 is reacted with a primary or secondary amine, preferably in aqueous solution and in the presence of a copper salt or of copper-bronze powder. If no copper catalyst is used, the reaction between the α-chloroacetylene and the primary or secondary amine takes considerable time even with heating. The use of the catalyst, however, greatly shortens the reaction time and in most instances, the reaction proceeds spontaneously without external heating.

In carrying out the reaction between an α-chloroacetylene and an amine, an excess of the amine is customarily employed to react with the hydrogen chloride produced as a by-product in the reaction. A ratio of from 2 to 5 moles of amine per mole of α-chloroacetylene is customarily employed. However, if the amine is difficult to obtain, an excess of a nonreacting basic substance can be employed in conjunction with an equimolar amount of the amine. For example, an inorganic base such as aqueous potassium hydroxide or sodium hydroxide can be used. In addition, organic bases which do not react with an α-haloacetylene; e.g., tertiary amines such as triethyl amine or pyridine, can also be employed.

The following specific examples illustrate the preparation of α-aminoacetylene intermediates useful for preparing the compounds of this invention.

EXAMPLE 19

Preparation of 3-isopropylamino-3-methyl-1-butyne

Five-ml. portions of 44.3 g. of isopropylamine were added to about 25 ml. of water. 25.5 g. of 3-chloro-3-methyl-1-butyne were added to the aqueous amine and the resulting homogeneous solution was allowed to stand at ambient room temperature for about one week. The reaction mixture had by this time separated into two layers. The reaction mixture was poured into a mixture containing 200 ml. of water and 200 ml. of ether. The aqueous layer was separated and discarded. The ethereal layer containing 3 - isopropylamino - 3 - methyl-1-butyne formed in the above reaction was washed with two 100-ml. portions of water and was dried over solid potassium hydroxide. 3-isoproplyamino-3-methyl-1-butyne was distilled and fractions boiling betwen 110–121° C. were collected. Redistillation of the combined fractions through a 30 cm. Vigreux column yielded purified 3-isopropylamino-3-methyl-1-butyne distilling in the range 115–118° C.; $n_D^{25}=1.419$. The distillate solidified upon standing and yielded crystalline 3-isopropylamino-3-methyl-1-butyne, melting at about 27° C.

*Analysis.*—Calc.: C, 76.74; H, 12.08. Found: C, 76.57; H, 12.19.

3-isopropylamino-3-methyl-1-butyne was converted to the corresponding hydrochloride salt by dissolving the free base in ethanol and adding an excess of a solution of ethanol saturated with hydrogen chloride. The ethanol was evaporated in vacuo leaving the hydrochloride as a residue. Recrystallization of the residue from a mixture of ethyl acetate and isopropyl alcohol yielded 3-isopropylamino-3-methyl-1-butyne hydrochloride melting at about 204–206° C.

*Analysis.*—Calc.: C, 59.43; H, 9.98; N, 8.66. Found: C, 59.30; H, 9.94; N, 8.55.

EXAMPLE 20

*Preparation of 3-t-butylamino-3-methyl-1-butyne*

Following the procedure of Example 19, 700 ml. of distilled water were added to 1,533 g. of t-butylamine. 714.5 g. of 3-chloro-3-methyl-1-butyne were added to the aqueous amine solution and the reaction mixture was allowed to stand at ambient room temperature for 11 days. 3-t-butylamino-3-methyl-1-butyne formed in the above reaction was isolated by the procedure of Example 19 and was purified by distillation through a Widmer column. The compound boiled at about 72–72.5° C. at a pressure of about 84 mm. of mercury; $n_D^{25}=1.430$. The distillate crystallized upon cooling to 0° C. It melted at about 24° C.

*Analysis.*—Calc.: N, 10.06. Found: N, 10.24.

3-t-butylamino-3-methyl-1-butyne hydrochloride was prepared by dissolving 5 g. of 3-t-butylamino-3-methyl-1-butyne in 25 ml. of anhydrous ether. The solution was cooled to about 0° C. and a 10 percent excess of a saturated ethereal hydrogen chloride solution was added. 3-t-butylamino-3-methyl-1-butyne hydrochloride precipitated and was separated by filtration. The precipitate was twice recrystallized from an ethanol-ethyl acetate solvent mixture. 3-t-butylamino-3-methyl-1-butyne hydrochloride thus purified melted at about 221–223° C.

*Analysis.*—Calc.: C, 61.52; H, 10.33; N, 7.97. Found: C, 61.27; H, 10.00; N, 8.16.

EXAMPLE 21

*Preparation of 3-isopropylamino-3-methyl-1-pentyne*

Following the procedure of Example 19, 100 ml. of distilled water were mixed with 177.3 g. of isopropylamine. 116.5 g. of 3-chloro-3-methyl-1-pentyne were added to the aqueous amine solution and the reaction mixture was allowed to stand at ambient room temperature for 7 days. 3-isopropylamino-3-methyl-1-pentyne formed in the above reaction was isolated by the procedure of Example 19. It was distilled through a glass helix-packed column. Purified 3-isopropylamino-3-methyl-1-pentyne boiled at about 77–77.5° C. at a pressure of 93 mm. of mercury; $n_D^{25}=1.426$.

*Analysis.*—Calc.: N, 10.06. Found: N, 9.90.

Following the procedure of Example 20, 3-isopropylamino-3-methyl-1-pentyne was converted to the corresponding hydrochloride salt, which melted at about 196–197° C.

*Analysis.*—Calc.: C, 61.52; H, 10.33; N, 7.97. Found: C, 61.86; H, 10.27; N, 8.05.

EXAMPLE 22

*Preparation of 3-t-butylamino-3-methyl-1-pentyne*

Following the procedure of Example 19, 100 ml. of water were mixed with 116.5 g. of t-butylamine. 219.3 g. of 3-chloro-3-methyl-1-pentyne were added to the aqueous amine solution and the reaction mixture was allowed to stand at ambient room temperature for about 13 days. 3-t-butylamino-3-methyl-1-pentyne formed in the above reaction was isolated by the procedure of Example 19 and was purified by distillation through a glass helix-packed column. 3 - t - butylamino-3-methyl-1-pentyne boiled at about 65° C. at a pressure of 25 mm. of mercury; $n_D^{25}=1.437$.

*Analysis.*—Calc.: N, 9.14. Found: N, 9.07.

Following the procedure of Example 20, 3-t-butylamino-3-methyl-1-pentyne was converted to the corresponding hydrochloride salt, which melted at about 204–205° C.

*Analysis.*—Calc.: C, 63.30; H, 10.63; N, 7.38. Found: C, 63.24; H, 10.63; N, 7.58.

EXAMPLE 23

*Preparation of 3-t-butylamino-3-ethyl-1-pentyne*

Following the procedure of Example 19, 100 ml. of water were mixed with 219.3 g. of t-butylamine. 130.5 g. of 3-chloro-3-ethyl-1-pentyne were added to the aqueous amine solution and the reaction mixture was allowed to stand at ambient room temperature for 13 days. 3-t-butylamino-3-ethyl-1-pentyne formed in the above reaction was isolated by the procedure of Example 19 and was purified by distillation through a glass helix-packed column. 3-t-butylamino-3-ethyl-1-pentyne boiled at about 75° C. at a pressure of 23 mm. of mercury; $n_D^{25}=1.440$.

*Analysis.*—Calc.: N, 8.37. Found: N, 8.33.

Following the procedure of Example 20, 3-t-butylamino-3-ethyl-1-pentyne was converted to the corresponding hydrochloride salt, which melted at about 267–268° C.

*Analysis.*—Calc.: C, 64.84; H, 10.89; N, 6.87. Found: C, 64.94; H, 10.83; N, 6.75.

EXAMPLE 24

*Preparation of 3-isopropylamino-3-ethyl-1-pentyne*

150 ml. of water were mixed with 266 g. of isopropylamine in a one-liter, three-neck flask equipped with stirrer and thermometer. 195.8 g. of 3-chloro-3-ethyl-1-pentyne were added to the aqueous amine solution followed by about 600 mg. of copper-bronze powder. The temperature of the reaction mixture quickly rose to about 65° C. The reaction mixture was maintained at about 40° C. by external cooling for about 4 hours. After standing overnight at ambient room temperature, the reaction mixture was poured into a mixture of 800 ml. of ether and 400 ml. of water. The organic layer was separated and the aqueous layer was extracted with two 250-ml. portions of ether. The ethereal layers were combined and were contacted with 500 ml. of 12 N hydrochloric acid diluted with an equal volume of water. 3-isopropylamino-3-ethyl-1-pentyne formed in the above reaction was converted to the corresponding hydrochloride salt, which was soluble in the aqueous layer. The organic layer was separated and was discarded. The aqueous layer was made alkaline to litmus by the addition of 50 percent sodium hydroxide. 3-isopropylamino-3-ethyl-1-pentyne free base, being insoluble in the alkaline layer, separated and was extracted with three 250-ml. portions of ether.

The ethereal layer was separated and was dried. The ether was removed by distillation through a Widmer column leaving as a residue 3-isopropylamino-3-ethyl-1-pentyne which was distilled through a Vigreux column. 3-isopropylamino-3-ethyl-1-pentyne boiled at about 71° C. at a pressure of about 25 mm. of mercury; $n_D^{25}=1.433$.

*Analysis.*—Calc.: N, 9.14. Found: N, 9.12.

Following the procedure of Example 20, 3-isopropylamino-3-ethyl-1-pentyne was converted to the corresponding hydrochloride salt, which melted at about 222–223° C.

*Analysis.*—Calc.: C, 63.30; H, 10.63; N, 7.38. Found: C, 63.58; H, 10.80; N, 7.40.

EXAMPLE 25

*Preparation of 3-ethylamino-3-ethyl-1-pentyne*

Following the procedure of Example 19, 42 ml. of water were added to 193 g. of a 70 percent aqueous ethylamine solution. 130.5 g. of 3-chloro-3-ethyl-1-pentyne were added to the aqueous amine solution and the reaction mixture was allowed to stand at ambient room temperature for about 15 days. 3-ethylamino-3-ethyl-1-pentyne formed in the above reaction was isolated by the procedure of Example 19, and was purified by distillation through a glass helix-packed column. 3-ethylamino-3-ethyl-1-pentyne boiled at about 83° C. at a pressure of 70 mm. of mercury; $n_D^{25}=1.437$.

*Analysis.*—Calc.: N, 10.06. Found: N, 9.89.

Following the procedure of Example 20, 3-ethylamino-3-ethyl-1-pentyne was converted to the corresponding hydrochloride salt, which melted at about 205–207° C.

*Analysis.*—Calc.: C, 61.52; H, 10.32; N, 7.97. Found: C, 61.27; H, 10.13; N, 7.88.

3-ethylamino-3-methyl-1-pentyne was prepared by the above procedure by substituting 3-chloro-3-methyl-1-pentyne for 3-chloro-3-ethyl-1-pentyne.

EXAMPLE 26

*Preparation of 3-t-amylamino-3-methyl-1-butyne*

Following the procedure of Example 19, 100 ml. of water were mixed with 261 g. of t-amylamine. 102.5 g. of 3-chloro-3-methyl-1-butyne were added and the reaction mixture was allowed to stand at ambient room temperature for about 28 days. The reaction mixture was then refluxed for about 24 hours to bring the reaction more nearly to completion. 3-t-amylamino-3-methyl-1-butyne thus formed was isolated by the procedure of Example 19, and was purified by distillation through a Widmer column. 3-t-amylamino-3-methyl-1-butyne boiled at about 51° C. at a pressure of 6 mm. of mercury; $n_D^{25}=1.437$.

*Analysis.*—Calc.: C, 78.36; H, 12.50; N, 9.14. Found: C, 78.11; H, 12.52; N, 9.06.

3-t-amylamino-3-methyl-1-butyne hydrochloride was prepared by adding an excess of ethanol saturated with hydrogen chloride to an ether solution of the free base. After isolation and purification, the compound melted at about 167–169° C.

*Analysis.*—Calc.: N, 7.38. Found: N, 7.17.

EXAMPLE 27

*Preparation of 3-isopropylamino-3,4-dimethyl-1-pentyne*

Following the procedure of Example 19, about 100 ml. of water were mixed with 280 g. of isopropylamine. 155 g. of 3-chloro-3,4-dimethyl-1-pentyne were added to the aqueous amine solution and the reaction mixture was allowed to stand at ambient room temperature for about 26 days. 3-isopropylamino-3,4-dimethyl-1-pentyne formed in the above reaction was isolated by the procedure of Example 19 and was purified by distillation. 3-isopropylamino-3,4-dimethyl-1-pentyne boiled at about 58–60° C. at a pressure of about 50 mm. of mercury.

3-isopropylamino-3,4-dimethyl-1-pentyne hydrochloride was prepared by adding an excess of ethanol saturated with hydrogen chloride to an ethereal solution of the free base. 3-isopropylamino-3,4-dimethyl-1-pentyne hydrochloride melted at about 179–181° C. after recrystallization from a mixture of ethyl acetate and isopropanol.

*Analysis.*—Calc.: Cl, 18.69; N, 7.38. Found: Cl, 18.71; N, 7.17.

We claim:

1. A compound selected from the group consisting of a free base and its salts formed with nontoxic pharmaceutically acceptable acids, said free base being represented by the following formula:

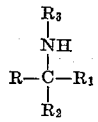

wherein R is a radical of the group consisting of methyl and ethyl, $R_1$ is a radical of the group consisting of ethyl and vinyl, $R_2$ is a radical of the group consisting of methyl, ethyl and isopropyl, and $R_3$ is a radical of the group consisting of ethyl, isopropyl, t-butyl and t-amyl, the sum of the carbon atoms in R, $R_1$, $R_2$ and $R_3$ being greater than 6.

2. 3-t-butylamino-3-methylbutane.
3. 3-isopropylamino-3,4-dimethylpentane.
4. 3-t-amylamino-3-methylbutane.
5. 3-isopropylamino-3-methyl-1-butene.
6. 3-t-butylamino-3-methyl-1-butene.

References Cited in the file of this patent

UNITED STATES PATENTS

| 2,019,275 | Sharples | Oct. 29, 1935 |
| 2,172,822 | Tamele et al. | Sept. 12, 1939 |

OTHER REFERENCES

Kozlov et al.: Chem. Abst., vol. 51, 4931 (1957).
Beilstein: Organische Chemie, vol. 4 (1922), p. 174.